United States Patent Office 3,579,537
Patented May 18, 1971

3,579,537
PROCESS FOR SEPARATION OF SULTONES FROM ALKENYL SULFONIC ACIDS
Joseph Rubinfeld and Henry Leon Levinsky, Brooklyn, N.Y., assignors to Colgate-Palmolive Company, New York, N.Y.
No Drawing. Filed Aug. 15, 1966, Ser. No. 581,409
Int. Cl. C07c 143/16; C07d 89/06
U.S. Cl. 260—327                    13 Claims

ABSTRACT OF THE DISCLOSURE

The instant process is directed to separation of a sultone and an alkenyl sulfonic acid from a mixture thereof prepared by sulfonation of an olefin with $SO_3$, which comprises adding to said mixture (a) a water-soluble lower ketone which is a solvent for said sultone and said acid, and (b) a base which forms with said sulfonic acid a water soluble sodium, potassium, lithium or ammonium salt insoluble in said solvent, whereby to form a precipitate of said salt and a solution of said sultone, the temperature at the time of formation of said precipitate being at least about 15° C.

This invention relates to the treatment of sulfonated olefins.

The production of olefin sulfonates and related products, as by the reaction of diluted gaseous $SO_3$ and an olefin is known to the art. The $SO_3$ is usually used in an amount in the neighborhood of 1 mole or so (e.g. 0.9 to 1.4 moles) per mole of olefin.

To obtain olefin sulfonates, which are valuable detergents, from the sulfonation reaction mixture, the mixture has been subjected to a hydrolysis treatment, as by heating it with an aqueous alkaline solution (or, alternatively, in aqueous acidic solution). Processes of this type are described in British Pats. 1,030,648 and 983,056, and published Dutch patent application 6414370. The products contain significant proportions of undesirable non-surface active "free oil" and are discolored.

When a sultone is the desired product, various treatments have been suggested. For example, in U.S. Pat. 3,164,608, the mixture obtained by reaction of $SO_3$ and an olefin is vacuum distilled; such a process requires a high vacuum, even when the sultone is of relatively low molecular weight, and the material is subjected to undesirably high temperatures during distillation; in addition, the patent indicates that the yield of sultone is relatively low and that the distillate is sometimes contaminated. Another method, described in the same U.S. Pat. 3,164,608, involves transforming the reaction mixture into a hydroxyalkane sulfonic acid by hydrolysis, as by boiling with water; the acid is then converted to a barium or sodium salt which is then reconverted to the acid form after which water is split off at an elevated temperature, e.g. 120–180° C., and the resulting sultone is distilled off under vacuum.

In accordance with one aspect of this invention, the acidic mixture produced by the sulfonation of the olefin (which acidic mixture is hereafter termed "acid mix") is mixed with a solvent for the sultone of said olefin and there is added a base which forms a water-soluble salt with the sulfonic acid of said olefin, whereby to form a precipitate of said salt and a solution of said sultone. In this manner, there can be recovered, easily and efficiently, a white, substantially dry, alkenyl sulfonate which is substantially free of sultone and unreacted olefin at the same time as there is obtained a solution from which the sultone can be readily recovered as by crystallization. By use of the process of this invention, one can readily avoid the formation of aqueous emulsions, stabilized by aqueous sulfonate detergent, which emulsions are very difficult to handle and from which it is extremely difficult to extract the individual components.

In an especially preferred form of the invention, the organic solvent and the base are added to a reaction mixture obtained by treating the $SO_3$-olefin reaction product with strong sulfuric acid, as disclosed in the copending application of Rubinfeld and Ouw, entitled Sulfonation, Ser. No. 548,827, filed May 10, 1966, now U.S. patent 3,428,654 of Feb. 18, 1969, which also discloses the details of the initial olefin —$SO_3$ reaction and of the materials used therefor. The sulfuric acid treated product (hereafter called "Stage II acid mix") has a much higher proportion of alkenyl sulfonic acids than the acidic mixture before such treatment ("Stage I acid mix"). Also, Stage II acid mix contains delta sultones in large amounts and these may be recovered readily from the solutions obtained in accordance with the process of this invention.

The solvent used in the process of this invention is preferably an organic solvent. Water immiscible solvents, such as hydrocarbons, ethers, or halohydrocarbons (e.g. pentane, diethyl ether or methylene chloride) may be employed. It is preferred, however, to use water-miscible solvents such as lower ketones (e.g. acetone, methyl ethyl ketone) and alcohols (e.g. ethanol, methanol or isopropanol), which minimize the tendency for emulsions to form. Particularly preferred solvents are the lower ketones, e.g. acetone. When, for example, aqueous sodium hydroxide is used as the base, we find that the lower ketone dissolves enough of the base to facilitate the reaction which forms the salt of the sulfonic acid, and that the latter salt is sufficiently insoluble in the lower ketone so that the salt precipitates out in very high yields; also we have found that the lower ketone is a good solvent for sultones at room temperature or above, but not a low temperature, thus facilitating subsequent separation of sultones from the solution. When water-immiscible solvents, such as hydrocarbons (e.g. pentane), are employed it is more difficult to obtain a quick and thorough reaction of added aqueous base with the dissolved sulfonation reaction mixture and a higher degree of agitation may be needed.

The above mentioned organic solvents may also be employed for washing the precipitate after it has been separated from the solution.

It is convenient to use a major proportion of solvent (e.g. more than one part of solvent, more particularly about 3 to 5 parts of solvent, per part of the acid mix) and to add the solvent without any special heating or cooling (e.g. using a temperature in the range of about 15 or 20 to 40 or 50° C. or higher).

The base may be added dry (e.g. as a powder) or, preferably, as a relatively concentrated aqueous solution. Excellent results have been obtained by the use of sodium hydroxide, added, for example, in the form of a 50% aqueous solution. A solution of sodium methoxide in ethanol has also been employed; at moderate temperatures (e.g. room temperature) this does not cause appreciable conversion of the sultone in the organic solvent to sulfonic acid. Other bases which may be added are other sodium alcoholates (e.g. sodium ethoxide) and basic salts, such as carbonates. The temperature during treatment with base may be, for example, in the range of about 15 or 20 to 50° C. or higher; tests with non-alcoholic solvents such as acetone and pentane show that at the boiling point of the solvent similar results are obtained, without significant hydrolysis or other conversion of sultone to sulfonic acid taking place. The amount of base is generally at least about equal to the amount of stoichiometrically equivalent to the acid content of the reaction mixture. It is often convenient to use some excess of base (e.g. 20% excess) to insure completion of neutralization; a very large excess is less desirable in that the base, together with water carried therewith, can be occluded onto the precipitated salt. The base need not be one which yields a sodium salt; for example, bases (such as KOH or LiOH) which yield other alkali metal salts or which yield ammonium salts may be used.

We have found that the solution in the organic solvent acts as its own indicator. The solution of the acid mix is generally chocolate brown; as the addition of base proceeds, the solution suddenly becomes pale yellow and the desired white precipitate forms. Some flocs of dispersed precipitate may be formed prior to this color change.

After the precipitation of the alkenyl sulfonate by treatment with the base, the precipitate may be separated easily from the solution, as by filtration, centrifuging, or decanting. The solution may be treated to isolate the sultone therefrom in any of several ways. For example, the solution may be cooled (e.g. to a temperature of less than 15°, such as in the range of about 0 to 10° C.) and, preferably, seeded with one or more crystals of the sultone to precipitate sultone from the solution, after which the solvent (which may still contain some unprecipitated sultone) is preferably recycled, for dissolving a further quantity of the olefin —$SO_3$ reaction mixture. Thus, in one continuous process, α-olefin is reacted continuously with $SO_3$ in one or more stages, then the resulting Stage I acid mix is treated continuously with strong sulfuric acid to produce a Stage II acid mix which is continuously dissolved in recycled solvent and treated with sodium hydroxide to form a precipitate of sodium alkenyl sulfonate and a solution of delta sultone; the latter solution is then cooled and seeded so that the sultone precipitates, and the supernatant liquid is recycled. The solvent may also be removed by distillation, leaving the sultone behind. Alternatively, the sultone solution may be used, as such, in a reaction in which thhe sultone is chemically converted to other materials in the presence of the solvent.

The monoolefin feedstock used in the reaction with $SO_3$ may contain olefins of the formula $RCH=CHR_1$, where R is an alkyl radical and $R_1$ is alkyl or hydrogen, preferably hydrogen, the olefins having, for example, 8–30 carbon atoms, preferably 12–21 carbon atoms. The feedstock may contain minor amounts of other constituents such as secondary or internal olefins, diolefins, cyclic olefins, aromatics, naphthenes and alkanes, and may be produced by cracking of petroleum wax, catalytic polymerization of ethylene, dehydration of long chain alcohols, etc. Best results have thus far been obtained when α-olefins (where $R_1$ is H) constitute a major proportion, e.g. above 70% and preferably at least 90% of the feedstock. A particularly preferred olefin feedstock contains in the range of about 12 to 21 carbon atoms in the molecule and yields alkenyl sulfonates having excellent detergency properties. Especially good foaming and detersive characteristics have been obtained by the use of a feedstock whose alpha-olefin content consists essentially of compounds of 15 to 18 carbon atoms.

In the sulfonation reaction the inert gas: $SO_3$ mole (volume) ratio is generally in the range of 5:1 to 100:1, preferably at least about 10:1, e.g. 50:1 to 20:1.

Among the inert gases which may be used for dilution of the sulfur trioxide are air and nitrogen, which are preferred, carbon dioxide, sulfur dioxide, low molecular weight paraffinic hydrocarbons, etc. The gaseous sulfur trioxide may be provided by vaporizing a stabilized liquid sulfur trioxide or by using converter gas obtained from a sulfur burner.

In carrying out the initial $SO_3$-olefin reaction, it is advantageous to maintain intimate contact between a supply of gaseous $SO_3$ and the olefin. This may be conveniently effected in a continuous manner by exposing to the $SO_3$ one or both faces of a thin flowing film of olefin, as by passing the thin film of olefin down the wall of a tube into the inner portion of which the $SO_3$ is injected.

During the initial $SO_3$-olefin reaction the temperature is advantageously maintained below 60° C., a temperature of less than about 50° C. and, when feasible, not above about 40° C. (e.g. within the range of about 10–40° C.) being preferred. It is usually desirable to work at a temperature at which the sulfonated material produced by the reaction remains in liquid condition. In general, it is desirable to use as low a temperature as possible, e.g. a temperature which is 5° C., or less, above the temperature at which freezing or precipitation takes place. Since the reaction between the $SO_3$ and the olefin is exothermic, it is advtantgeous to use suitable cooling means; thus, cooling may be effected by passing a cooling medium, such as water, through a jacket surrounding the tubular reactor in which the $SO_3$ olefin reaction takes place.

A typical Stage I mix (made with a 1:1 $SO_3$:olefin mole ratio) contains in the neighborhood of about 35 mole percent anionically active ingredients (based on moles of olefin and measured by titration of the acidic mix with a standard cetyl trimethylammonium bromide solution). Stage I and Stage II acid mixes are usually dark brown viscous materials, having an appearance similar to a melted chocolate bar.

In making the Stage II acid mix, the sulfuric acid may be supplied as a separate stream, being added as an aqueous solution (e.g. a 60% sulfuric acid solution) or as 100% sulfuric acid or as oleum (e.g. 65% oleum). 20% oleum has given excellent results, as has sulfuric acid supplied as a 90% or 97% solution; the latter are preferred over the oleum because of economy in use of material and production of less discoloration. The optimum quantity of sulfuric acid incorporated in this stage of the process is dependent on the reaction conditions in this stage and in the initial stage. Generally, the amount of added sulfuric acid will be in the range of about 2 to 300 parts by weight per 100 parts of Stage I acid mix. For Stage I acid mixes made with 0.8–1.2 mole of $SO_3$ per mole of olefin the amount of added sulfuric acid is preferably in the range of 2 to 100, e.g. 2 to 50, parts by weight per 100 parts by weight of Stage I mix. Even when a 60% $H_2SO_4$ aqueous solution is employed, the amount of water supplied in the added acid is small, e.g. less than 10% of the weight of the Stage I mix; in the preferred process it is less than 5%, usually less than 3%. Thus, the sulfuric acid treatment takes place under substantially non-hydrolyzing conditions, in contrast to treatment in dilute aqueous medium.

The sulfuric acid treatment is preferably effected at a temperature sufficient to keep the mixture in a flowable state. The temperatures may, for example, be in the range of about 10 to 100° C., preferably in the range of about 25 to 60° C. The duration of the sulfuric acid treatment is advantageously relatively short, preferably less than about an hour, best results being obtained with times of less than about 20 minutes, e.g. 5 minutes or less. Good results have been obtained even when the sulfuric acid was injected into the Stage I mix less than one minute before the mixture was brought into contact with an alkaline neutralizing agent (e.g. excess aqueous NaOH); in one run the Stage I mix was blended with the sulfuric acid and heated to about 55° C. during a period of about 13 seconds and then directly neutralized.

The addition of the sulfuric acid may be effected in any suitable apparatus, preferably one in which the ingredients are mixed together thoroughly and quickly. One suitable technique for continuous operation is to feed the Stage I mix and sulfuric acid to a recycle loop. Good results have also been obtained when the sulfuric acid was injected into the Stage I mix while the latter was passing through the sulfonation apparatus; e.g. when a tubular falling film tower was employed, as previously described, with the olefin and diluted $SO_3$ fed to the top of a vertical tube 20 feet high, the sulfuric acid was injected at a point halfway up the tube. Still another method for carrying out the treatment is to feed the sulfuric acid and Stage I mix to a pump at one end of a length of tubing without recycling.

The following examples are given to illustrate this invention further. Unless otherwise noted, all proportions in this specification are by weight. Also, pressure in the examples are atmospheric unless otherwise specified.

EXAMPLE I

A stage II acid mix is prepared by continuously reacting an olefin feedstock with $SO_3$ diluted with air in a vertical tubular reactor and continuously treating the reaction mixture with strong sulfuric acid. More specifically, the olefin feed stock is an eighteen carbon essentially straight chain α-monoolefin (made by anionic polymerization of ethylene) which is fed at the rate of 40 lbs. per hr. to the top of a vertical tubular falling film reactor 20 feet high so that a film of the olefin flows down the inner wall of the tubular reactor while a gaseous mixture of air and 4% (by volume) of $SO_3$ is injected downward into the center of the tubular reactor at the top thereof at a rate supplying about 14 lbs./hr. of $SO_3$. The Stage I acid mix from the tubular reactor (which is at a temperature of about 40-50° C.) is treated with 5 lbs./hr. of 97% sulfuric acid, in a recycle loop, for about 2-5 minutes at about 40° C. to produce a Stage II acid mix.

1 part of the chocolate-colored Stage II acid mix is dissolved in 3 parts of acetone. 0.35 parts of aqueous 50% NaOH solution are added gradually to the solution with continuous stirring. The color of the brown mixture suddenly turns yellow and a snowy white precipitate forms; it contains sodium alkenyl sulfate and sodium sulfate and its content of anionically active ingredient is 81%. No separate liquid aqueous solution of the olefin sulfonate is observed. After the precipitate has settled, the supernatant organic layer is siphoned off, chilled to 0° C. and seeded with a few crystals of the corresponding 18 carbon delta sultone so that crystals of the pure delta sultone precipitate; these highly pure crystals are filtered off and the solvent is recycled for admixture with the Stage II acid mix being formed.

The sodium alkenyl sulfonate precipitate is a highly effective detergent, having a very light color even without bleaching.

EXAMPLE II

One part of the Stage II acid mix of Example I is dissolved in 2 parts of anhydrous ethanol and a solution of 0.25 part of sodium methoxide in 1 part of anhydrous ethanol is added to the solution of the acid mix. The results are similar to those of Example I.

EXAMPLE III

Example I is repeated, using pentane in place of acetone. The caustic solution tends to settle to the bottom of the mixture making it necessary to stir more vigorously and for a longer time to obtain the desired reaction. The results are similar to those of Example I.

EXAMPLE IV

Example I is repeated but the sulfuric acid treatment is omitted, so that a Stage I acid mix (containing 31% of anionically active ingredient and 6% of "free oil") is dissolved in the acetone and treated with the sodium hydroxide solution. A snowy white precipitate forms immediately; it contains sodium alkenyl sulfonate and very little sodium sulfate, and its content of anionically active material is 95.5%. After filtering off the precipitate, there remains a solution from which the gamma sultone can be recovered by crystallization or evaporation.

EXAMPLE V

Example I is repeated, substituting methyl ethyl ketone for the acetone, with similar results.

EXAMPLE VI

Example I is repeated, substituting 0.5 part of aqueous 50% KOH solution for the NaOH solution, with similar results.

EXAMPLE VII

Example I is repeated, substituting 0.5 part of an aqueous 30% $NH_4OH$ solution for the NaOH solution. The ammonium alkenyl sulfonate forms as a gummy mass which separates out at the bottom of the mixture. This gummy precipitate is removed from the acetone solution and is dissolved in hot water; it goes into solution very readily.

EXAMPLE VIII

In this example, there is used a Stage II acid mix made from a crude C15-C20 olefin feedstock, having a boiling range of about 275-315° C. (8% residue), made by cracking paraffin wax, and having the following composition, as reported by the supplier:

| | Percent |
|---|---|
| Acyclic monoolefins | 84 |
| Diolefins and naphthenic olefins | 9 |
| Paraffins and naphthenes | 5 |
| Cyclic diolefins and dicyclic olefins | 1 |
| Aromatics | 1 |

92% of the cyclic monoolefins were alpha-monoolefins. The average molecular weight of the monoolefin portion was about 240 and the distribution of olefins was 2% C14, 18% C15, 20% C16, 21% C17, 18% Cli, 16% C19, 5% C20. 1 part of this acid mix is dissolved in 3 parts of acetone while heating to bring the solution to its boiling point under reflux. 0.35 part of aqueous 50% NaOH solution is added gradually to the refluxing solution with continuous stirring; the color changes as described in Example I, and a light yellow precipitate containing the sodium alkenyl sulfonate forms. The precipitated material has a color value of 240 Klett (measured after dilution with water to give a mixture having a 5% content of anionically active material); in contrast, when the neutralization is effected in excess aqueous medium without the acetone the color is over 900 Klett.

It is another feature of the invention that it may be used directly for the production of solid mixtures of other detergents with the alkenyl sulfonate. In the following example, an aqueous dispersion of another long chain sulfonate detergent is blended with the base to be added to the solution in organic solvent. While the added sulfonate there disclosed is a higher alkyl benzene sulfonate, it will be understood that it is within the broader scope of the invention to use other anionic detergents such as sulfonates or sulfates (e.g. sodium tallow alcohol sulfate) or appropriate non-ionic detergents. It is also within the broader scope of the invention to include water-soluble builder salts (e.g. condensed phosphates such as a pentasodium tripolyphosphate, tetrapotassium pyrophosphate, or organic builders such as sodium nitrilotriacetate in the solution of the base, so as to form precipitated solid built detergents directly; the amount of builder salt so added may be, for example, about ½ to 20, preferably about 2 to 10, parts of builder salt per part of organic detergent.

EXAMPLE IX 100 parts of an aqueous 46% slurry of a substantially biodegradable sodium linear tridecylbenzenesulfonate was mixed with 16 parts of aqueous 50% NaOH and added to a solution of the Stage II acid mix of Example I in 500 parts of acetone. The color of the acetone solution turns yellow and there is formed a snowy white precipitate containing sodium alkenyl sulfonate and the sodium tridecylbenzene sulfonate.

In all the above examples, the pressure was atmospheric unless overwise noted, the temperature of the reagent solutions was about room temperature (e.g. 20° C.) and there was some rise in temperature owing to the heat of neutralization.

While the invention has its greatest utility in the treatment of acid mixes containing alkenyl sulfonic acids and sultones, in its broader aspect it has utility in the treatment of those olefin —SO₃ reaction mixtures, generally, which contain components that form a water-soluble olefin sulfonate salt on the addition of the base.

Although the present invention has been described with reference to particular embodiments and examples, it will be apparent to those skilled in the part that variations and modifications can be substituted therefor without departing from the principles and true spirit of the invention.

What is claimed is:

1. In the process for making sulfur-containing products by the sulfonation of an olefin with $SO_3$ to produce a mixture comprising a sultone and an alkenyl sulfonic acid, the improvement which comprises adding to said mixture (a) a water-soluble lower ketone which is a solvent for said sultone and said acid, and (b) a base which forms with said sulfonic acid a water-soluble sodium, potassium, lithium or ammonium salt insoluble in said solvent, whereby to form a precipitate of said salt and a solution of said sultone, the temperature at the time of formation of said precipitate being at least about 15° C.

2. Process as in claim 1 in which said solvent is added to said mixture and said base is added to the solution of the mixture in said solvent.

3. Process as in claim 1 in which said olefin has about 8 to 30 carbon atoms.

4. Process as in claim 3 in which the process is effected under conditions under which substantially no hydrolysis of the sultone occurs.

5. Process as in claim 1 in which said olefin has about 12 to 20 carbon atoms, the amount of water present is such that substantially no liquid aqueous solution of the salt is formed, the amount of said solvent is at least as great as the amount of said mixture, the temperature at the time of formation of said precipitate is in the range of about 15 to 50° C., and said base forms the sodium salt of said sulfonic acid.

6. In the process for making olefin sulfonates by the sulfonation of an olefin with $SO_3$ to produce an acidic mixture, the improvement which comprises adding to such mixture a water-soluble lower ketone which is a solvent therefor and a base which forms with at least one component of said mixture a water-soluble sodium, potassium, lithium or ammonium olefin sulfonate insoluble in said solvent whereby to form a precipitate of said sodium, potassium, lithium or ammonium olefin sulfonate and recovering said precipitate.

7. Process as in claim 1 which an aqueous solution containing another detergent is added to said mixture.

8. Process as in claim 7 in which said solvent is added to said mixture and there is then added an aqueous solution of sodium alkylbenzene sulfonate and sodium hydroxide, whereby to form a precipitate of a blend of sodium alkenyl sulfonate and the sodium alkylbenzene sulfonate.

9. Process as in claim 1 and including the step of separating said precipitate from substantially the entire supernatant liquid.

10. Process as in claim 9 including the step of cooling the resulting separated liquid to precipitate sultone therefrom.

11. Process as in claim 10 in which said separated liquid is cooled to a temperature less than 15° C.

12. Process as in claim 6 in which acetone and said base are added to said acidic mixture to form said precipitate, the temperature at the time of said precipitation being in the range of about 15 to 50° C.

13. Process as in claim 1 in which acetone and sodium hydroxide are added to said acidic mixture to form said precipitate.

References Cited

UNITED STATES PATENTS

| | | | |
|---|---|---|---|
| 2,092,797 | 9/1937 | Carr | 260—513 |
| 3,428,654 | 2/1969 | Rubinfeld et al. | 260—513 |
| 3,444,087 | 5/1969 | Eccles et al. | 260—513 |
| 2,860,144 | 11/1958 | Wirth | 260—513 |

DANIEL D. HORWITZ, Primary Examiner

U.S. Cl. X.R.

260—505, 513